United States Patent
Ahuja et al.

(10) Patent No.: US 8,307,367 B2
(45) Date of Patent: Nov. 6, 2012

(54) SMART SCHEDULING OF AUTOMATIC PARTITION MIGRATION BY THE USE OF TIMERS

(75) Inventors: Manish Ahuja, Pflugerville, TX (US); Nathan D. Fontenot, Georgetown, TX (US); Jacob Lorien Moilanen, Austin, TX (US); Joel Howard Schopp, Austin, TX (US); Michael Thomas Strosaker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 916 days.

(21) Appl. No.: 12/398,230

(22) Filed: Mar. 5, 2009

(65) Prior Publication Data
US 2010/0229181 A1    Sep. 9, 2010

(51) Int. Cl.
G06F 9/46 (2006.01)
G06F 12/00 (2006.01)
(52) U.S. Cl. .................... 718/102; 718/107; 706/10
(58) Field of Classification Search .................. 718/107, 718/102; 711/173
See application file for complete search history.

(56) References Cited

U.S. PATENT DOCUMENTS

| | | | | |
|---|---|---|---|---|
| 5,236,120 | A * | 8/1993 | Kleemola | 229/5.5 |
| 7,904,749 | B2 * | 3/2011 | Kawaguchi | 714/6.1 |
| 2005/0268298 | A1 * | 12/2005 | Hunt et al. | 718/1 |
| 2006/0020943 | A1 | 1/2006 | Boutcher et al. | |
| 2007/0067435 | A1 | 3/2007 | Landis et al. | |
| 2007/0128899 | A1 * | 6/2007 | Mayer | 439/152 |
| 2007/0169121 | A1 | 7/2007 | Hunt et al. | |
| 2007/0174361 | A1 | 7/2007 | Branda et al. | |
| 2008/0189468 | A1 * | 8/2008 | Schmidt et al. | 711/6 |
| 2010/0107003 | A1 * | 4/2010 | Kawaguchi | 714/6 |
| 2011/0072225 | A1 * | 3/2011 | Kawaguchi et al. | 711/162 |

* cited by examiner

*Primary Examiner* — Khanh Dinh
(74) *Attorney, Agent, or Firm* — Yee & Associates, P.C.; Steven L. Bennett

(57) ABSTRACT

Partition migrations are scheduled between virtual partitions of a virtually partitioned data processing system. The virtually partitioned data processing system is a tickless system in which a periodic timer interrupt is not guaranteed to be sent to the processor at a defined time interval. A request is received for a partition migration. Gaps between scheduled timer interrupts are identified. The partition migration is then scheduled to occur within the largest gap.

20 Claims, 5 Drawing Sheets

SMART SCHEDULING OF AUTOMATIC PARTITION MIGRATION BY THE USE OF TIMERS

BACKGROUND OF THE INVENTION

1. Field of the Invention

The present invention relates generally to a computer implemented method, a data processing system, and a computer program product. More specifically, the present invention relates to a computer implemented method, a data processing system, and a computer program product for the smart scheduling of automatic partition migration by the user of timers.

2. Description of the Related Art

Increasingly large symmetric multi-processor data processing systems are not being used as single large data processing systems. Instead, these types of data processing systems are being partitioned and used as smaller systems. These systems are also referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platforms resources. These platform allocable resources include one or more architecturally distinct processors and their interrupt management area, regions of system memory, and input/output (I/O) adapter bus slots. The partition's resources are represented by the platform's firmware to the operating system image.

Each distinct operating system or image of an operating system running within a platform is protected from each other, such that software errors on one logical partition cannot affect the correct operation of any of the other partitions. This protection is provided by allocating a disjointed set of platform resources to be directly managed by each operating system image and by providing mechanisms for ensuring that the various images cannot control any resources that have not been allocated to that image. Furthermore, software errors in the control of an operating system's allocated resources are prevented from affecting the resources of any other image. Thus, each image of the operating system or each different operating system directly controls a distinct set of allocable resources within the platform.

With respect to hardware resources in a logical partitioned data processing system, these resources are shared disjointly among various partitions. These resources may include, for example, input/output (I/O) adapters, memory DIMMs, non-volatile random access memory (NVRAM), and hard disk drives. Each partition within a logical partitioned data processing system may be booted and shut down over and over without having to power-cycle the entire data processing system.

During operation, it is often necessary to migrate the operating system from a partition on a first logical partitioned data processing system to a partition on a second logical partitioned data processing system. Partition migration can be an intensive and disruptive task to the operating system executing within the migrated partition. Partition migration often involves shutting down or quiescing applications in order to accurately move data and state information from the sending partition to the receiving partition. After migration, the current state and system configuration must then be restored. Partition migration will therefore generally necessitate some inconvenience to an operator during the time required for partition migration.

BRIEF SUMMARY OF THE INVENTION

According to one illustrative embodiment of the present invention, a computer implemented method in a virtually partitioned data processing system, a data processing system, and a computer program product are provided for scheduling a partition migration between virtual partitions of the virtually partitioned data processing system. The virtually partitioned data processing system is a tickless system in which a periodic timer interrupt is not guaranteed to be sent to the processor at a defined time interval. A request is received for a partition migration. Gaps between scheduled timer interrupts are identified. The partition migration is then scheduled to occur within the largest gap.

DETAILED DESCRIPTION OF THE INVENTION

Figure 1:
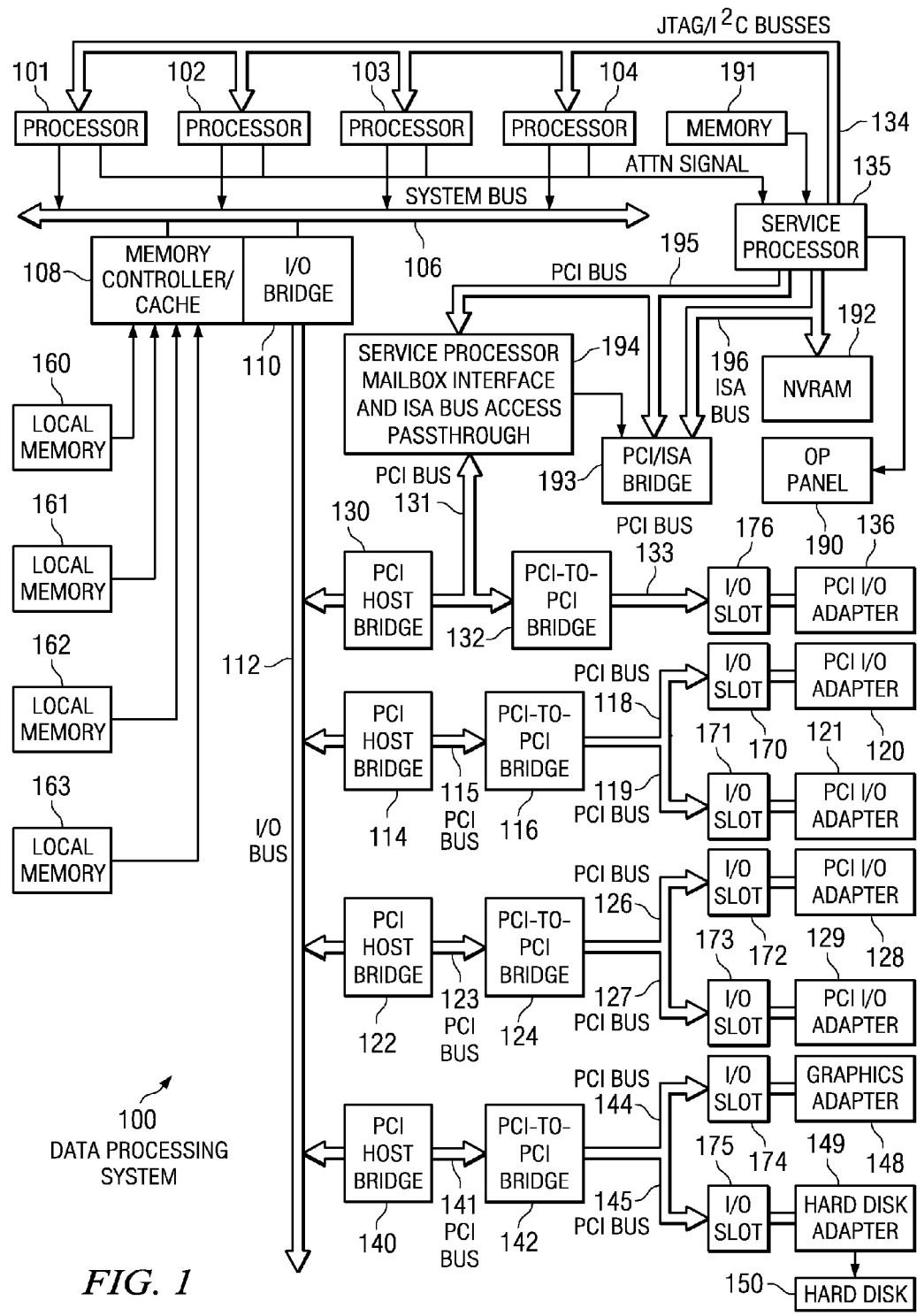
FIG. 1 is a block diagram of a data processing system in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note, that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures, and in particular with reference to FIG. 1, a block diagram of a data processing system in which illustrative embodiments may be implemented is depicted. Data processing system 100 may be a symmetric multiprocessor (SMP) system including processors 101, 102, 103, and 104, which connect to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to local memories 160, 161, 162, and 163. I/O bridge 110 connects to system bus 106 and provides an interface to I/O bus 112. Memory controller/cache 108 and I/O bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120, 121, 128, 129, and 136, graphics adapter 148, and hard disk adapter 149 may be assigned to different logical partitions. In this case, graphics adapter 148 connects to a display device (not shown), while hard disk adapter 149 connects to and controls hard disk 150.

Thus, for example, suppose data processing system 100 is divided into three logical partitions, P1, P2, and P3. Each of PCI I/O adapters 120, 121, 128, 129, and 136, graphics adapter 148, hard disk adapter 149, each of host processors 101, 102, 103, and 104, and memory from local memories 160, 161, 162, and 163 is assigned to each of the three partitions. In these examples, memories 160, 161, 162, and 163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160, 161, 162, and 163, and I/O adapters 120, 128, and 129 may be assigned to logical partition P1; processors 102 and 103, some portion of memory from local memories 160, 161, 162, and 163, and PCI I/O adapters 121 and 136 may be assigned to partition P2; and processor 104, some portion of memory from local memories 160, 161, 162, and 163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. PCI I/O adapters 120 and 121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/ output devices such as, for example, other network computers, which are clients to data processing system 100.

An additional PCI host bridge 122 provides an interface for an additional PCI bus 123. PCI bus 123 connects to a plurality of PCI I/O adapters 128 and 129. PCI I/O adapters 128 and 129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through 194 and PCI-to-PCI bridge 132. Service processor mailbox interface and ISA bus access pass-through 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101, 102, 103, and 104 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I²C busses 134 to interrogate the system (host) processors 101, 102, 103, and 104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101, 102, 103, and 104, memory controller/cache 108, and I/O bridge 110. Any error information for failures detected during the BISTs, BATs, and memory tests are gathered and reported by service processor 135.

If a meaningful and valid configuration of system resources is still possible after taking out the elements found to be faulty during the BISTs, BATs, and memory tests, then data processing system 100 is allowed to proceed to load executable code into local (host) memories 160, 161, 162, and 163. Service processor 135 then releases host processors 101, 102, 103, and 104 for execution of the code loaded into local memory 160, 161, 162, and 163. While host processors 101, 102, 103, and 104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101, 102, 103, and 104, local memories 160, 161, 162, and 163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for de-configuration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to illustrative embodiments.

Figure 2:
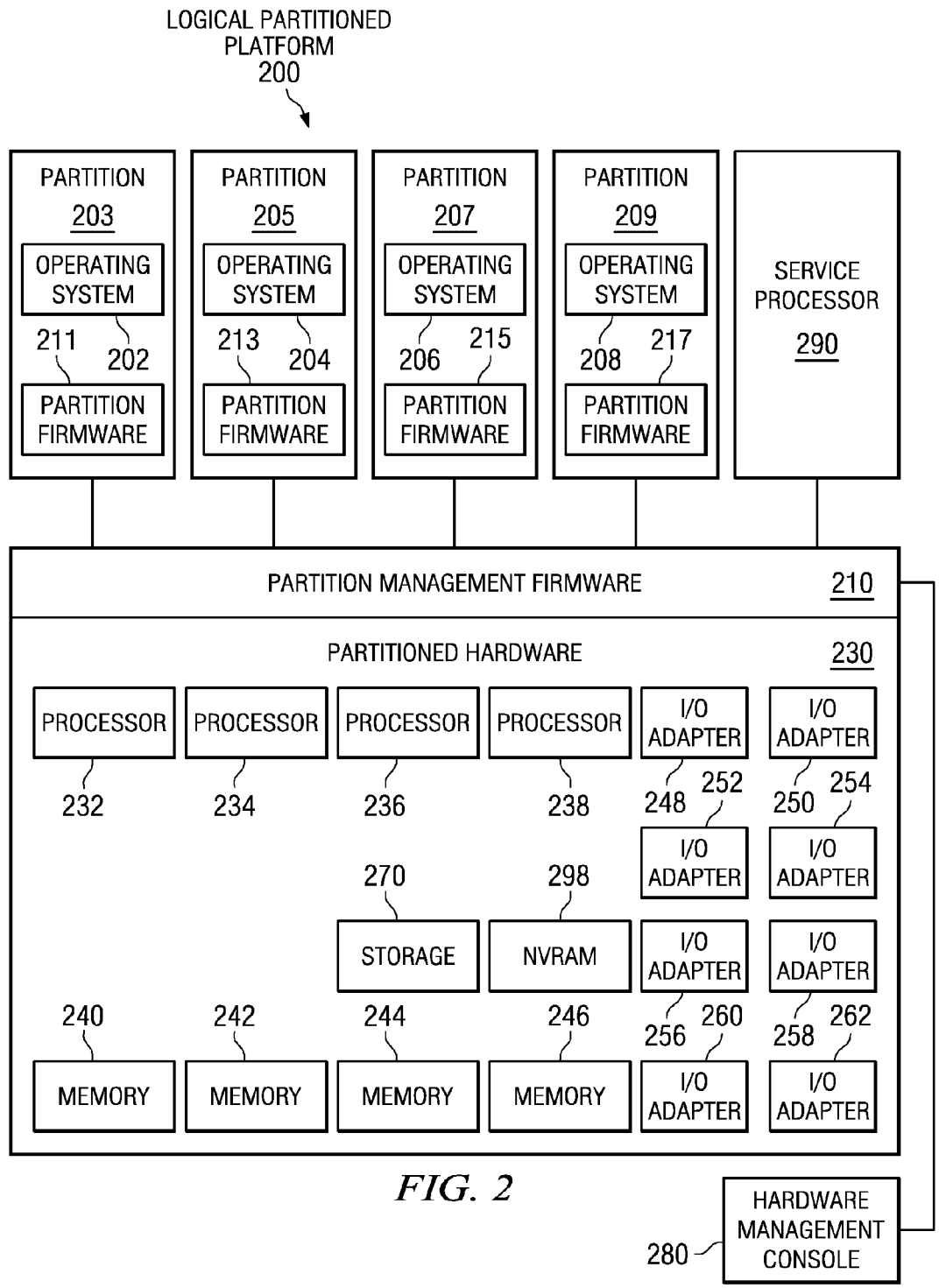
FIG. 2 is a block diagram of an exemplary logical partitioned platform in which illustrative embodiments may be implemented.

With reference now to FIG. 2, a block diagram of an exemplary logical partitioned platform is depicted in which illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor, which is available from International Business Machines Corporation. OS/400 is used only as an example in these illustrative embodiments. Of course, other types of operating systems, such as AIX and Linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes processors 232, 234, 236, and 238, memories 240, 242, 244, and 246, input/output (I/O) adapters 248, 250, 252, 254, 256, 258, 260, and 262, and a storage unit 270. Each of processors 232, 234, 236, and 238, memories 240, 242, 244, and 246, NVRAM storage 298, and I/O adapters 248, 250, 252, 254, 256, 258, 260, and 262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

Figure 3:
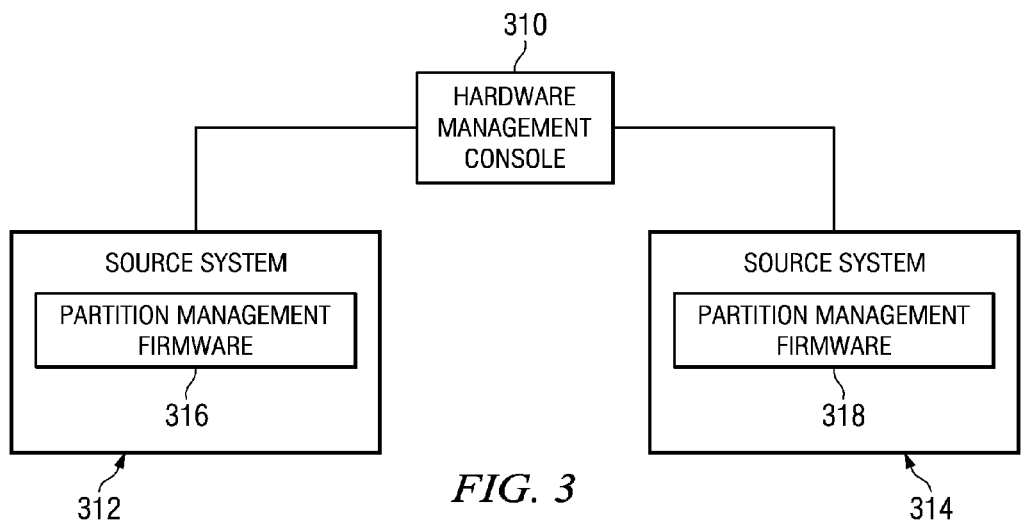
FIG. 3 is a dataflow for an inactive migration according to an illustrative embodiment.
Figure 4:
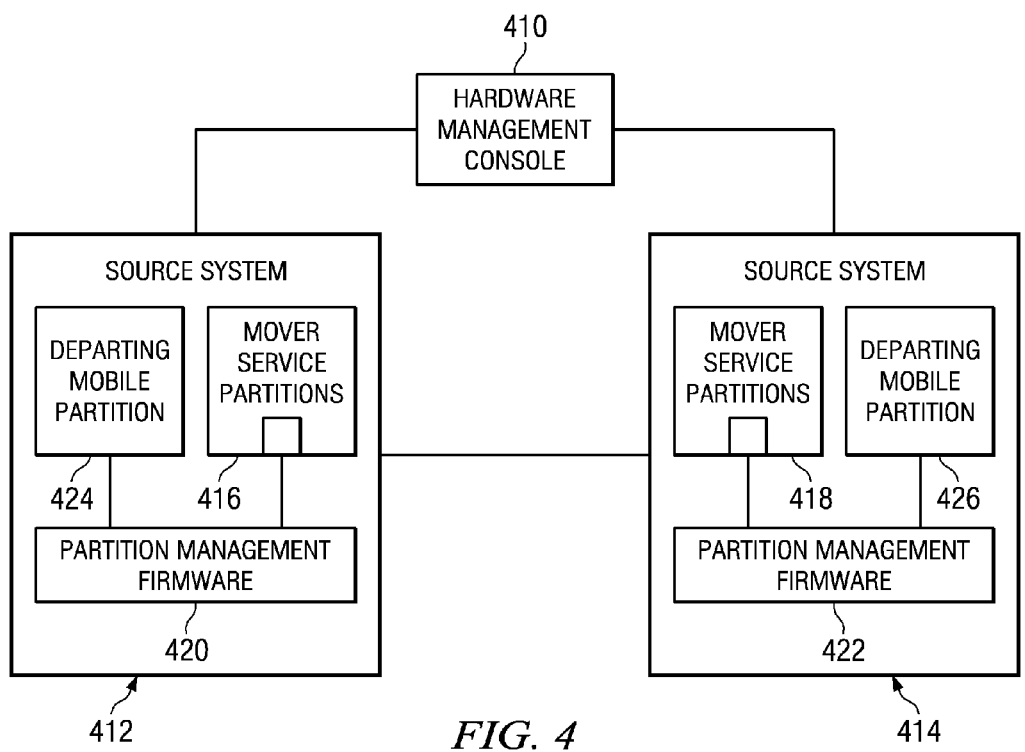
FIG. 4 is a dataflow for an active migration according to an illustrative embodiment.

Referring now to FIG. 3 and FIG. 4, a simplified data flow of a partition migration is shown according to an illustrative embodiment. The partition migration data flow of FIG. 3 is an inactive migration. The partition migration data flow of FIG. 4 is an active migration. The partition migration of FIG. 3 and FIG. 4 can occur between a logical partition of a first logical partitioned data processing system, such as logical partitioned platform 200 of FIG. 2, and a logical partition of a second logical partitioned data processing system, such as logical partitioned platform 200 of FIG. 2.

Referring now specifically to FIG. 3, a dataflow for an inactive migration is shown according to an illustrative embodiment. An inactive partition migration allows for the movement of a powered off partition, along with its profiles and virtualized resources, from one server to another. Hardware management console 310 can be hardware management console 280 of FIG. 2.

Prior to migration, the infrastructure of the logical partitioned platforms is prepared, and the configuration and readiness of the source system 312 and destination system 314 is ensured. Hardware management console 310 then inhibits any changes to the source system and the source system 312 that might invalidate the migration. Hardware management console 310 extracts the virtual device mappings from the Virtual I/O Servers of source system 312 and uses these mappings to generate a source-to-destination virtual adapter migration map.

Hardware management console 310 creates a compatible partition shell on the destination system 314, and a migration profile for the mobile partition. Hardware management console 310 then copies over the partition profiles. This includes all the existing profiles associated with the mobile partition on source system 312 and the migration profile.

Hardware management console 310 then creates any required adapters in the Virtual I/O Servers on destination system 314 and completes memory mapping. On completion of the transfer of state, hardware management console 310 sets the migration state to completed and informs partition management firmware 316 on source system 312 and partition management firmware 318 on destination system 314 that the migration is complete.

Referring now specifically to FIG. 4, a dataflow for an active migration is shown according to an illustrative embodiment. An active partition migration function provides the capability to move a running operating system, hosted middleware, and applications between two systems without disrupting the service provided. Hardware management console 410 can be hardware management console 280 of FIG. 2.

Hardware management console 410 creates a compatible partition shell 426 and a partition profile on the destination system 414. Partition shell 426 is used to reserve the resources required to receive departing mobile partition 424 inbound from source system 412. The creation of partition shell 426 on destination system 414 ensures that all of the required resources are available for departing mobile partition 424 and cannot be stolen at some point during the migration.

Hardware management console 410 configures the mover service partitions 416 and 418 on source system 412 and destination system 414. Mover service partitions 416 and 418 establish a connection between partition management firmware 420 on source system 412 and partition management firmware 422 on destination system 414. Additionally, mover service partitions 416 and 418 establish a communications channel between themselves for transporting the state of departing mobile partition 424 to partition shell 426.

Mover service partition 416 starts sending partition state information to mover service partition 418, copying the mobile partition's physical pages to the physical memory reserved by partition shell 426 on destination system 414. Because the departing mobile partition 424 is still active, its state continues to change during migration. Memory pages of departing mobile partition 424 that are modified during state transfer are flagged, and then subsequently resent. This flagging and resending can be repeated until all memory pages have been transferred. Any pages that are continuously changing must be sent during a quiesced period of source system 412 during which partition management firmware 420 suspends all running threads within departing mobile partition 424.

When all state information has been sent to destination system 414, the mobile partition resumes execution within partition shell 426 on destination system 414. Partition shell 426 can then re-establish its operating environment. Partition shell 426 can retry pending I/O requests that were not completed by departing mobile partition 424. Partition shell 426 can also send address resolution protocol requests on any virtual local area network adapters to update the address resolution protocol caches in the various switches and systems in the external network.

Because partition migration often involves shutting down or quiescing applications, operators experience various levels of inconvenience during the time required for partition migration. Most partitions and their servers experience idle times during their operating life. Partition migrations could be scheduled within these idle times in effort to reduce the disruption and invasiveness caused by the migration. However, it is difficult to track those idle times. Additionally, scripts, IO functions, and other processes may be scheduled despite a partition being indicated as idle.

The illustrative embodiments described herein provide a computer implemented method in a virtually partitioned data processing system, a data processing system, and a computer program product are provided for scheduling a partition migration between virtual partitions of the virtually partitioned data processing system. The virtually partitioned data processing system is a tickless system in which a periodic timer interrupt is not guaranteed to be sent to the processor at a defined time interval. A request is received for a partition migration. Gaps between scheduled timer interrupts are identified. The partition migration is then scheduled to occur within the largest gap.

Figure 5:
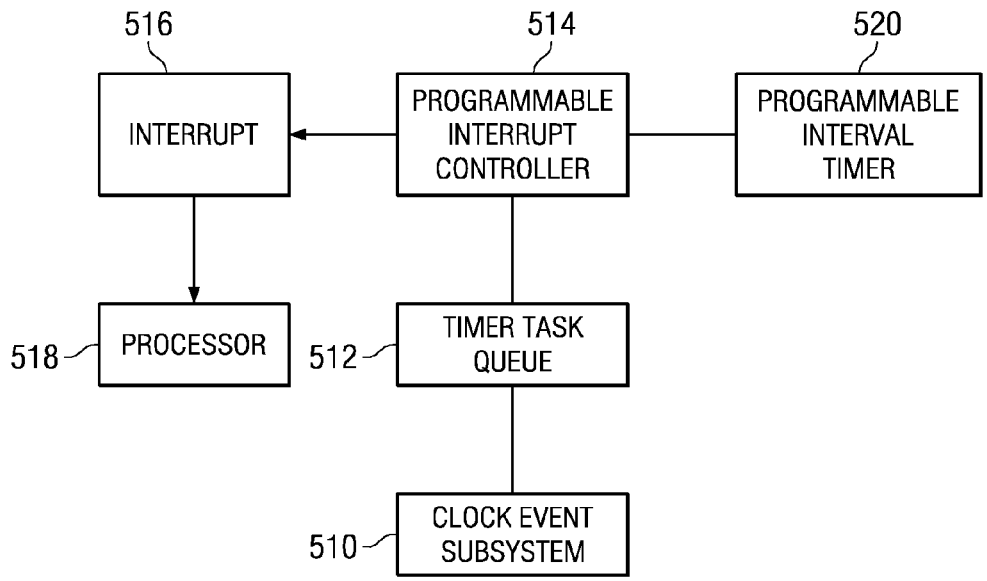
FIG. 5 is a dataflow for scheduling partition migrations in a tickless system according to an illustrative embodiment.

Referring now to FIG. 5, a dataflow for scheduling partition migrations in a tickless system is shown according to an illustrative embodiment. The dataflow of FIG. 5 is a kernel process executed within an operating system of a logical partitioned data processing system, such as one of operating systems 202-208 of FIG. 2. The dataflow of FIG. 5 is depicted within a tickless system. A tickless system is a data processing system and its associated operating system(s) in which a periodic timer interrupt is not guaranteed to be sent to the processor at a defined time interval.

Clock event subsystem 510 schedules the clock event driven kernel functionalities to timer task queue 512. Clock event subsystem 510 can be, for example, but is not limited to, a timing system based on a number of clock cycles, or a high resolution, high precision event timer.

Timer task queue 512 is a data structure containing instructions that are to be processed at some future time. Thus, instructions or tasks which should be delayed to some future time can be entered into timer task queue 512. Clock event subsystem 510 can schedule timer interrupts into timer task queue 512 at discontinuous times.

When a timer interrupt scheduled in timer task queue 512 becomes due, programmable interrupt controller 514 sends interrupt 516 to processor 518. Upon receipt of interrupt 518, depending on scheduling priorities, processor 518 can switch executed processes.

Programmable interval timer 520 is a periodic counter which triggers the periodic timer interrupt when the counter reaches the programmed count. Counters are usually programmed with fixed increment intervals which determine how long the counter counts before it triggers the periodic timer interrupt. The interval increments therefore determine the resolution for which the counter may be programmed to generate its one-shot or periodic interrupt. Programmable interval timer 520 can be disabled so that the periodic timer interrupt is not triggered. Programmable interval timer 520 can be disabled, for example, when processor 518 enters an idle loop. When programmable interval timer 520 is disabled, the associated data processing system operates as a tickless system.

Figure 6:
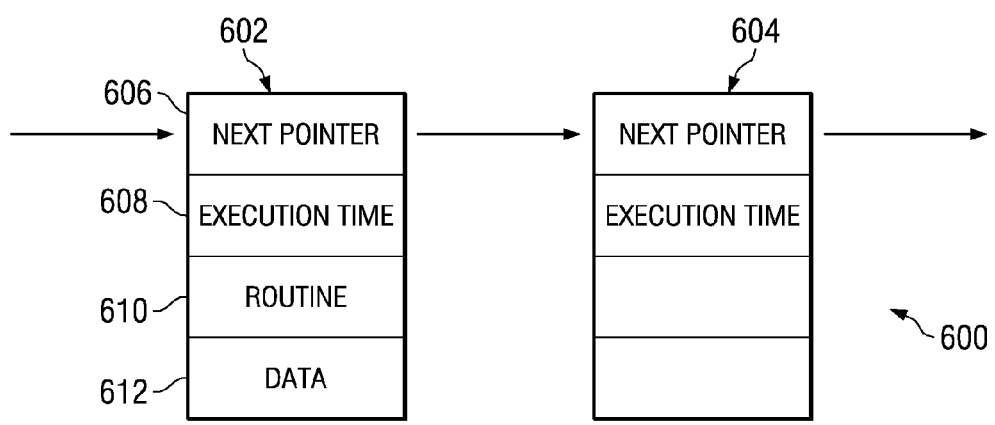
FIG. 6 is a task queue data structure according to an illustrative embodiment.

Referring now to FIG. 6, a task queue data structure is shown according to an illustrative embodiment. Task queue 600 can be timer task queue 512 of FIG. 5. While task queue 600 is shown as a linked list, such is for illustrative purposes only. Task queue 600 can be, for example, but is not limited to, arrays, linked lists, vlists, hash tables, binary trees, heaps, and buffers.

In the illustrative example, task queue 600 includes entry 602 and entry 604. While task queue 600 is shown with only two entries, such is for illustrative purposes only. Task queue 600 can include any number of entries corresponding to scheduled tasks.

Entry 602 includes next pointer 606. Next pointers indicate a next entry in task queue 600. Therefore, next pointer 606 indicates entry 604.

Entry 602 includes execution time 608. Execution time 608 is a time at which the event or routine indicated by entry 602 should be executed. Execution time 608 is determined from a clock system which can be a timing system based on a number of clock cycles, or a high resolution, high precision event timer.

Entry 602 also includes routine 610 and data 612. Routine 610 is an indication of the desired routine, instruction, call or action that is to be made. Data 612 is any data, or an indication of data, necessary to complete the desired routine, instruction, call or action indicated by routine 610.

Figure 7:
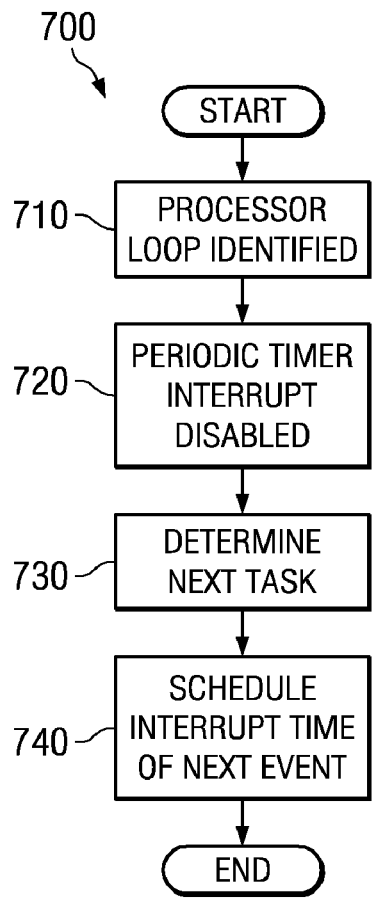
FIG. 7 is a flowchart for establishing a tickless system according to an illustrative embodiment.

Referring now to FIG. 7, a flowchart for establishing a tickless system is shown according to an illustrative embodiment. Process 700 is a software process, executing on a software component, such as one of operating systems 202-208 of FIG. 2.

Process 700 begins when an associated processor enters an idle loop (step 710). The idle loop is a process executed when the associated processor is not otherwise executing other processes. The idle loop can be a state of reduced power consumption by the processor. The idle loop can be instructions that halts processor activity until the next external interrupt, such as interrupt 516 of FIG. 5, is fired.

Responsive to entering the idle loop, process 700 disables the periodic timer interrupt (step 720). Process 700 can disable the periodic timer interrupt by turning off the periodic timer interrupt within the programmable interval timer, which can be programmable interval timer 520 of FIG. 5.

Process 700 identifies a next scheduled task (step 730). The next scheduled task can be identified by examining a task queue, such as timer task queue 512 of FIG. 5.

Responsive to identifying the next scheduled task, process 700 programs the programmable interval timer to resume periodic timer interrupts at the time of the next scheduled task (step 740), with the process terminating thereafter. During the time in which the programmable interval timer is disabled, the associated data processing system is a tickless system, wherein a periodic timer interrupt is not guaranteed to be sent to the processor at a defined time interval.

Figure 8:
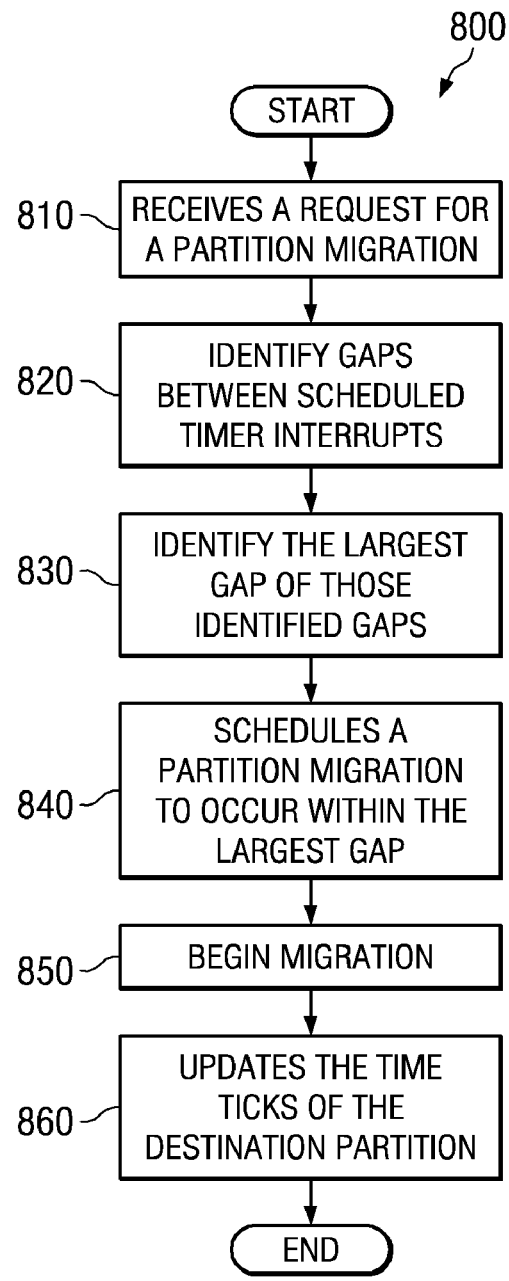
FIG. 8 is a flowchart for scheduling a partition migration according to an illustrative embodiment.

Referring now to FIG. 8, a flowchart for scheduling a partition migration is shown according to an illustrative embodiment. Process 800 is a software process, executing on a software component, such as one of operating systems 202, 204, 206, and 208 of FIG. 2.

Process 800 begins by receiving a request for a partition migration (step 810). The partition migration can be an inactive migration, as shown in FIG. 3, or an active migration, as shown in FIG. 4.

Responsive to receiving the request for the partition migration, process 800 identifies gaps between scheduled timer interrupts (step 820). Gaps between scheduled timer interrupts are the times that will elapse between timer interrupts scheduled in a task queue, such as task queue 600 of FIG. 6. Process 800 can identify these gaps by identifying an amount of time between successive scheduled interrupts scheduled in the task queue. Process 800 can identify this amount of time by examining the times at which successive scheduled interrupts are to occur, such as for example, by examining execution times of the scheduled events, such as execution time 608 of entry 602, and an execution time for entry 604, all of FIG. 6.

In one illustrative embodiment, process 800, and step 820 specifically, will only identify those gaps that occur within a specified time period. By placing a cap on the time period examined, a partition migration will be guaranteed to be scheduled within that specified time period, as will be understood. The specified time period can be a user configurable parameter.

Responsive to identifying gaps between scheduled timer interrupts, process 800 identifies the largest gap of those identified gaps (step 830). The largest gap represents the largest time duration between successive scheduled timer interrupts. The processor is more likely to be idle during this largest gap than during other identified gaps.

Responsive to identifying the largest gap, process 800 schedules the partition migration to occur within the largest gap (step 840). Upon the occurrence of the interrupt immediately preceding the scheduled migration, process 800 begins the migration (step 850). The migration can be either an active migration, or an inactive migration. An inactive migration is described in FIG. 3, and summarized as follows: Hardware management inhibits any changes to the source system that might invalidate the migration. Hardware management extracts the virtual device mappings from the Virtual I/O Servers of source system and uses these mappings to generate a source-to-destination virtual adapter migration map. Hardware management creates a compatible partition shell on the destination system and a migration profile for the mobile partition. Hardware management then copies over the partition profiles. Hardware management then creates any required adapters in the Virtual I/O Servers on the destination system.

An active migration is described in FIG. 4, and summarized as follows: Hardware management creates a compatible partition shell and a partition profile on the destination system. Hardware management configures the mover service partitions on both the source system and the destination system. The mover service partition on the source system starts sending partition state information to mover service partition on the destination system, copying the mobile partition's physical pages to the physical memory on the destination system. Memory pages of departing mobile partition that are modified during state transfer are flagged, and then subsequently resent. Any pages that are continuously changing must be sent during a quiesced period of source system during which partition management firmware suspends all running threads within departing mobile partition. When all state information has been sent to destination system, the mobile partition resumes execution on the destination system. The Partition shell can then re-establish its operating environment.

Upon completion of the migration, process 800 updates the timer ticks of the destination partition (step 860), with the process terminating thereafter. The timer tic is updated to correct for any deviation of the timer tic. The timer tic can be corrected for example, but not limited to, by correlating the timer tic with a timer within the hypervisor.

Thus, the illustrative embodiments described herein provide A computer implemented method in a virtually partitioned data processing system, a data processing system, and a computer program product are provided for scheduling a partition migration between virtual partitions of the virtually partitioned data processing system. The virtually partitioned data processing system is a tickless system in which a periodic timer interrupt is not guaranteed to be sent to the processor at a defined time interval. A request is received for a partition migration. Gaps between scheduled timer interrupts are identified. The partition migration is then scheduled to occur within the largest gap.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a virtually partitioned data processing system for scheduling a partition migration between virtual partitions of the virtually partitioned data processing system, the method comprising the computer implemented steps of: receiving a request for a partition migration between the virtual partitions in the virtually partitioned data processing system, wherein the virtually partitioned data processing system is a tickless system in which a periodic timer interrupt is not guaranteed to be sent to the processor at a defined time interval; responsive to receiving the request for the partition migration, identifying a plurality of gaps between a plurality of scheduled timer interrupts; identifying a largest gap of the plurality of gaps; and scheduling the partition migration to occur within the largest gap.

2. The computer implemented method of claim 1, further comprising the computer implemented steps of: identifying that a processor associated with a first one of the virtual partitions has entered an idle loop; responsive to identifying that a processor associated with the first one of the virtual partitions has entered an idle loop, disabling periodic timer interrupts for the processor; identifying a time of a next scheduled task for the processor; and responsive to identifying the next scheduled task for the processor, programming a programmable interval timer associated with the processor to resume the periodic timer interrupts at the time of the next scheduled task.

3. The computer implemented method of claim 2, wherein the step of receiving the request for the partition migration further comprises: receiving the request for the partition migration, wherein the request is a request for the first one of the virtual partitions to be migrated to a second partition; and migrating the first one of the virtual partitions to the second partition while the periodic timer interrupts for the processor associated with a first one of the virtual partitions is disabled.

4. The computer implemented method of claim 2, further comprising the computer implemented step of: responsive to an occurrence of the next scheduled task, resuming the periodic timer interrupts for the processor.

5. The computer implemented method of claim 1, further comprising the computer implemented steps of: identifying a time at which each of a plurality of successive scheduled interrupts scheduled within a timer task queue are to occur; wherein the step of identifying a plurality of gaps between a plurality of scheduled timer interrupts is further responsive to identifying a time at which each of a plurality of successive scheduled interrupts scheduled within a timer task queue are to occur.

6. The computer implemented method of claim 1, wherein the computer implemented step of identifying a plurality of gaps between a plurality of scheduled timer interrupts further comprises: responsive to receiving the request for a partition migration, identifying a plurality of gaps between a plurality of scheduled timer interrupts within a specified time period such that the partition migration is guaranteed to be scheduled within the specified time period.

7. The computer implemented method of claim 1 wherein the computer implemented step of migrating the first one of the virtual partitions to the second partition while the periodic timer interrupts for the processor associated with a first one of the virtual partitions is disabled further comprises: migrating the first one of the virtual partitions to the second partition while the periodic timer interrupts for the processor associated with a first one of the virtual partitions is disabled, wherein the partition migration is one of an inactive migration or an active migration.

8. A computer storage device having a computer program product encoded thereon, the computer program product being configured for scheduling a partition migration between virtual partitions of the virtually partitioned data processing system, the computer program product comprising: computer usable code for receiving a request for a partition migration between the virtual partitions in the virtually partitioned data processing system, wherein the virtually partitioned data processing system is a tickless system in which a periodic timer interrupt is not guaranteed to be sent to the processor at a defined time interval; computer usable code, responsive to receiving the request for the partition migration, for identifying a plurality of gaps between a plurality of scheduled timer interrupts; computer usable code for identifying a largest gap of the plurality of gaps; and computer usable code for scheduling the partition migration to occur within the largest gap.

9. The computer storage device of claim 8, wherein the computer program product further comprises: computer usable code for identifying that a processor associated with a first one of the virtual partitions has entered an idle loop; computer usable code, responsive to identifying that a processor associated with the first one of the virtual partitions has entered an idle loop, for disabling periodic timer interrupts for the processor; computer usable code for identifying a time of a next scheduled task for the processor; and computer usable code, responsive to identifying the next scheduled task for the processor, for programming a programmable interval timer associated with the processor to resume the periodic timer interrupts at the time of the next scheduled task.

10. The computer storage device of claim 9, wherein the computer usable code for receiving the request for the partition migration further comprises: computer usable code for receiving the request for the partition migration, wherein the request is a request for the first one of the virtual partitions to be migrated to a second partition; and computer usable code for migrating the first one of the virtual partitions to the second partition while the periodic timer interrupts for the processor associated with a first one of the virtual partitions is disabled.

11. The computer storage device of claim 9, wherein the computer program product further comprises: computer usable code, responsive to an occurrence of the next scheduled task, for resuming the periodic timer interrupts for the processor.

12. The computer storage device of claim 8, wherein the computer program product further comprises: computer usable code for identifying a time at which each of a plurality of successive scheduled interrupts scheduled within a timer task queue are to occur; wherein the step of identifying a plurality of gaps between a plurality of scheduled timer interrupts is further responsive to identifying a time at which each of a plurality of successive scheduled interrupts scheduled within a timer task queue are to occur.

13. The computer storage device of claim 8, wherein the computer usable code for identifying a plurality of gaps between a plurality of scheduled timer interrupts further comprises: computer usable code, responsive to receiving the request for a partition migration, for identifying a plurality of gaps between a plurality of scheduled timer interrupts within a specified time period such that the partition migration is guaranteed to be scheduled within the specified time period.

14. The computer storage device of claim 8, wherein the computer usable code for migrating the first one of the virtual partitions to the second partition while the periodic timer interrupts for the processor associated with a first one of the virtual partitions is disabled further comprises: computer usable code for migrating the first one of the virtual partitions to the second partition while the periodic timer interrupts for the processor associated with a first one of the virtual partitions is disabled, wherein the partition migration is one of an inactive migration or an active migration.

15. A data processing system for scheduling a partition migration between virtual partitions of the virtually partitioned data processing system, the data processing system comprising: a bus; a memory connected to the bus, wherein the memory comprises computer-executable instructions; a processor unit, wherein the processor unit executes the computer-executable instructions to direct the data processing system: to receive a request for a partition migration between the virtual partitions in the virtually partitioned data processing system, wherein the virtually partitioned data processing system is a tickless system in which a periodic timer interrupt is not guaranteed to be sent to the processor at a defined time interval; responsive to receiving the request for the partition migration, to identify a plurality of gaps between a plurality of scheduled timer interrupts; to identify a largest gap of the plurality of gaps; and to schedule the partition migration to occur within the largest gap.

16. The data processing system of claim 15, wherein the processor unit further executes the computer-executable instructions to direct the data processing system: to identify that a processor associated with a first one of the virtual partitions has entered an idle loop; responsive to identifying that a processor associated with the first one of the virtual partitions has entered an idle loop, to disable periodic timer interrupts for the processor; to identify a time of a next scheduled task for the processor; and responsive to identifying the next scheduled task for the processor, to program a programmable interval timer associated with the processor to resume the periodic timer interrupts at the time of the next scheduled task.

17. The data processing system of claim 16, wherein the computer-executable instructions directing the data processing system to receive the request for the partition migration further comprises the processor unit executing the computer-executable instructions to direct the data processing system: to receive the request for the partition migration, wherein the request is a request for the first one of the virtual partitions to be migrated to a second partition; and to migrate the first one of the virtual partitions to the second partition while the periodic timer interrupts for the processor associated with a first one of the virtual partitions is disabled.

18. The data processing system of claim 16, wherein the processor unit further executes the computer-executable instructions to direct the data processing system: responsive to an occurrence of the next scheduled task, to resume the periodic timer interrupts for the processor.

19. The data processing system of claim 15, wherein the processor unit further executes the computer-executable instructions to direct the data processing system: to identify a time at which each of a plurality of successive scheduled interrupts scheduled within a timer task queue are to occur; wherein the step of identifying a plurality of gaps between a plurality of scheduled timer interrupts is further responsive to identifying a time at which each of a plurality of successive scheduled interrupts scheduled within a timer task queue are to occur.

20. The data processing system of claim 15, wherein the processor unit executing the computer-executable instructions to direct the data processing system to identify a plurality of gaps between a plurality of scheduled timer interrupts further comprises the processor unit executing the computer-executable instructions: responsive to receiving the request for a partition migration, to identify a plurality of gaps between a plurality of scheduled timer interrupts within a specified time period such that the partition migration is guaranteed to be scheduled within the specified time period.

* * * * *